(12) United States Patent
Yamada et al.

(10) Patent No.: US 9,862,301 B2
(45) Date of Patent: Jan. 9, 2018

(54) VEHICULAR REAR PANEL

(71) Applicant: Koito Manufacturing Co., Ltd., Tokyo (JP)

(72) Inventors: Kenji Yamada, Shizuoka (JP); Masaaki Nakabayashi, Shizuoka (JP); Koji Uchino, Shizuoka (JP); Manabu Maeda, Shizuoka (JP); Noriaki Ito, Shizuoka (JP); Norimasa Yamamoto, Shizuoka (JP); Asami Nakada, Shizuoka (JP); Yuji Sakurai, Shizuoka (JP); Hiroya Koizumi, Shizuoka (JP); Tsukasa Tokida, Shizuoka (JP); Takao Muramatsu, Shizuoka (JP); Tomoaki Otani, Shizuoka (JP); Motohiro Komatsu, Shizuoka (JP); Akihiro Matsumoto, Shizuoka (JP); Takashi Terayama, Shizuoka (JP); Hiroki Ishibashi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 221 days.

(21) Appl. No.: 14/805,642

(22) Filed: Jul. 22, 2015

(65) Prior Publication Data

US 2015/0321599 A1 Nov. 12, 2015

Related U.S. Application Data

(63) Continuation of application No. 13/927,351, filed on Jun. 26, 2013, now abandoned.

(30) Foreign Application Priority Data

Jun. 29, 2012 (JP) .................................. 2012-147035

(51) Int. Cl.
*F21V 9/00* (2015.01)
*B60Q 1/00* (2006.01)
(Continued)

(52) U.S. Cl.
CPC ........... *B60Q 1/0035* (2013.01); *B60Q 1/268* (2013.01); *B60Q 1/2661* (2013.01); *B60Q 1/302* (2013.01);
(Continued)

(58) Field of Classification Search
CPC ...... B60Q 1/302; B60Q 1/268; B60Q 1/0035; B60Q 1/2661; F21S 48/20; F21S 48/2268; G02B 6/0023
See application file for complete search history.

(56) References Cited

U.S. PATENT DOCUMENTS 6,305,813 B1 10/2001 Lekson et al.
6,536,930 B1 3/2003 Hirmer
(Continued)

FOREIGN PATENT DOCUMENTS

JP 05-069777 A 3/1993

*Primary Examiner* — Evan Dzierzynski
(74) *Attorney, Agent, or Firm* — Abelman, Frayne & Schwab

(57) ABSTRACT

A vehicular rear panel with a new configuration is provided. The vehicular rear panel according to an aspect of the present disclosure is made of a resin material and disposed on a rear vehicle body part. The vehicular rear panel includes a light guiding unit configured to guide light from the light source along an extending direction of the vehicular rear panel and a light emitting unit configured to emit light in the light guiding unit to a rear side of a vehicle.

10 Claims, 19 Drawing Sheets

(51) Int. Cl.
*F21V 8/00* (2006.01)
*B60Q 1/26* (2006.01)
*B60Q 1/30* (2006.01)
*F21S 8/10* (2006.01)

(52) U.S. Cl.
CPC ........... *F21S 48/215* (2013.01); *F21S 48/225* (2013.01); *F21S 48/2243* (2013.01); *F21S 48/2268* (2013.01); *F21S 48/2281* (2013.01); *F21S 48/2287* (2013.01); *G02B 6/0023* (2013.01); *G02B 6/0038* (2013.01)

(56) References Cited

U.S. PATENT DOCUMENTS

| | | | |
|---|---|---|---|
| 2011/0013412 A1* | 1/2011 | Kobayashi | F21S 48/114 362/538 |
| 2011/0241376 A1* | 10/2011 | Igura | B60J 5/101 296/146.3 |
| 2011/0267833 A1 | 11/2011 | Verrat-Debailleul et al. | |

* cited by examiner

VEHICULAR REAR PANEL

CROSS-REFERENCE TO RELATED APPLICATIONS

This application is a continuation of U.S. patent application Ser. No. 13/927,351, filed on Jun. 26, 2013, which claims priority from Japanese Application No. 2012-147035, filed on Jun. 29, 2012, both of which are incorporated herein by reference.

TECHNICAL FIELD

The present disclosure relates to a vehicular rear panel, especially a vehicular rear panel which is mounted on a vehicle such as, for example, a car.

BACKGROUND

Japanese Patent Laid-Open Publication No. H05-69777 discloses a high-mount stop lamp which is attached to a rear wind shield of a vehicle, i.e., an inner upper part of the rear window and used as a stop lamp.

SUMMARY

Recently, the resinification of a vehicular rear panel has been sought for the purpose of such as, for example, weight lightening of vehicles. In such a circumstance, the present inventors have repeatedly conducted a careful research regarding a vehicular rear panel formed of a resin material and, as a result, have obtained a vehicular rear panel with a new configuration which is provided with a function of a vehicular lamp such as, for example, a stop lamp.

The present disclosure has been made based on the present inventors' such recognition and an aspect of the present disclosure is to provide a vehicular rear panel with a new configuration.

According to an aspect of the present disclosure, there is provided a vehicular rear panel which is made of a resin material and disposed at a rear vehicle body part. The vehicular rear panel includes a light guiding unit configured to guide light from a light source along the extending direction of the vehicular rear panel and a light emitting unit configured to emit light within the light guiding unit to the rear of the vehicle.

According to the above-described aspect, a vehicular rear panel with a new configuration may be provided.

In another aspect, the vehicular rear panel may be provided with a rear window part and the light guiding unit and the light emitting unit may be provided on the rear window part. Also, in the present aspect, the rear window part has a curved portion which causes scenery to be discontinuous when viewed from a driver side and the light guiding unit and the light emitting unit may be provided at the curved portion. Further, in any of the above-described aspects, the vehicular rear panel may be provided with a light shielding part configured to suppress the light from the light source from proceeding toward the front of the vehicle. Furthermore, in any of the above-described aspects, one end of the light guiding unit may be disposed in the vicinity of the light source installed on the vehicle body and the other end may be disposed in the vicinity of the light emitting unit. With above-described aspects, a vehicular rear panel with a new configuration may also be provided.

According to the present disclosure, a vehicular rear panel with a new configuration may be provided.

The above-described summary is for illustration purposes only and does not intend to limit in any ways. In addition to the illustrative embodiments, examples, and features described above, additional embodiments, examples, and features will become apparent by referring to the drawings and the following detailed description.

DETAILED DESCRIPTION

In the following detailed descriptions, reference will be made to the accompanying drawings which form a part of the present application. The illustrative embodiments described in the detailed descriptions, drawings, and the claims do not intend to limit. Other embodiments may be used and other modified examples may be made without departing from the spirit or scope of the subject matter represented in the present application.

Hereinafter, detailed descriptions of the present disclosure will be made with reference to the drawings based on the condign exemplary embodiments. The same or equivalent components, members and processings that are represented in each of the drawings are assigned with the same symbols and repeated descriptions thereof will be properly omitted. Also, the exemplary embodiments exemplify the present disclosure rather than limiting the present disclosure and it shall not be concluded that all the features or the combinations described in the exemplary embodiments are necessarily essential to the present disclosure.

[First Exemplary Embodiment]

Figure 1A:
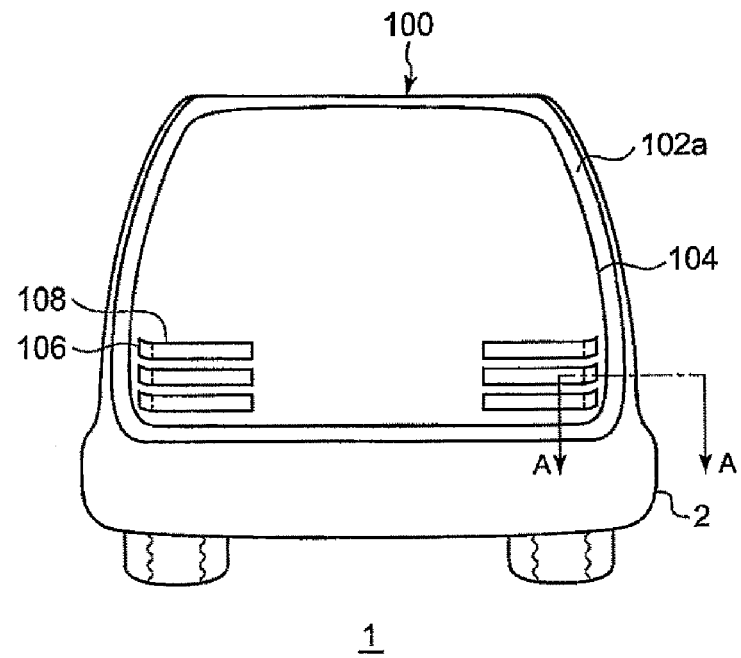
FIG. 1A is a schematic front view illustrating a configuration of a vehicular rear panel according to a first exemplary embodiment.
Figure 1B:
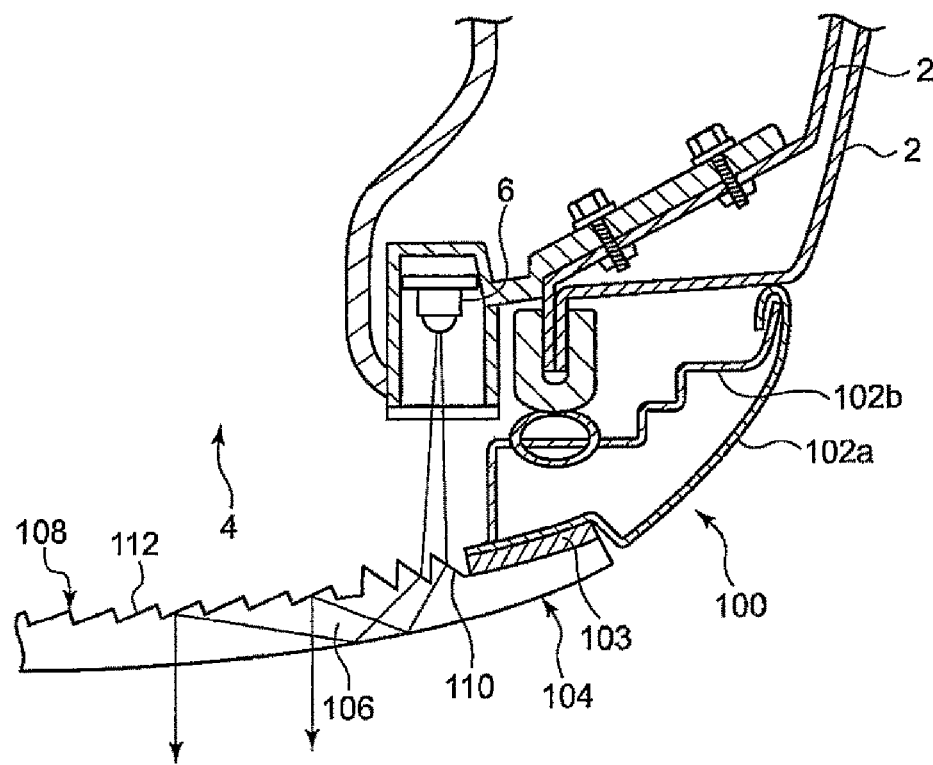
FIG. 1B is a cross-sectional view taken along line A-A in FIG. 1A.

FIG. 1A is a schematic front view illustrating a configuration of a vehicular rear panel according to the first exemplary embodiment. FIG. 1A illustrates a state in which a vehicle 1 equipped with a vehicular rear panel 100 is viewed from the rear side. FIG. 1B is a cross-sectional view taken along line A-A in FIG. 1A. The vehicular rear panel 100 according to the present exemplary embodiment is disposed on a rear vehicle body part 2 of the vehicle 1 and made of a resin material. The vehicular rear panel 100 is made of a material such as, for example, polycarbonate resin or acrylic resin. The vehicular rear panel 100 of the present disclosure forms a retractable backdoor and shields an opening 4 of the rear vehicle body part 2.

The vehicular rear panel 100 includes a backdoor outer panel 102a, a backdoor inner panel 102b, and a rear window part 104. Hereinafter, the backdoor outer panel 102a and the backdoor inner panel 102b will be properly called a backdoor panel 102 in block. The backdoor panel 102 is a frame having an opening and the opening is provided with the rear window part 104. The rear window part 104 is provided with a seal member 103 such as, for example, packing around the peripheral edge thereof and fixed to the backdoor outer panel 102a with the seal member 103 being interposed between the rear window part 104 and the back door outer panel 102a. The rear window part 104 of the present exemplary embodiment is formed from a transparent resin material such as, for example, polycarbonate resin or acrylic resin. The rear window part 104 is a region which may be used for a driver's rear visibility. Also, in the vehicular rear panel 100, the backdoor outer panel 102a and/or the backdoor inner panel 102b and the rear window part 104 may be integrally formed. In this case, for example, by molding a transparent resin material into a sheet of plate and conducting a coloring on a region which is to be a backdoor panel, the vehicular rear panel 100 in which the backdoor outer panel 102a and/or the backdoor inner panel 102b and the rear window part 104 are integrally formed may be obtained. Further, the whole vehicular rear panel 100 may be transparent. In this case, the whole vehicular rear panel 100 forms the rear window part 104.

A semiconductor light-emitting element 6 as a light source is provided at a predetermined location of the peripheral edge of the opening 4 of the rear vehicle body part 2. The semiconductor light-emitting element 6 may be formed using a light-emitting element such as, for example, LED ("light-emitting diode"), LD ("laser diode"), organic or inorganic EL ("electro luminescence"). In the present exemplary embodiment, three semiconductor light-emitting elements 6 are arranged in the vertical direction at each of left and right sides to correspond to light emitting units 108 to be described below with the opening 4 being interposed between the left and right light-emitting elements 6. The vehicular rear panel 100 includes: a light guiding unit 106 configured to guide light from a light source which is radiated from the semiconductor light-emitting element 6 along the extending direction of the vehicular rear panel 100; and a light emitting unit 108 configured to emit the light in the light guiding unit 106 toward the rear side of the vehicle. The light guiding unit 106 and the light emitting unit 108 have light transmittance. The light guiding unit 106 and the light emitting unit 108 of present exemplary embodiment are provided on the rear window part 104. Also, in the present exemplary embodiment, the light guiding unit 106 and the light emitting unit 108 are formed by a portion of the rear window part 104. Three light guiding units 106 and three light emitting units 108 are arranged in the vertical direction at each of left and right sides of the rear window part 104 and extend in the horizontal direction, respectively. Further, the vehicular rear panel 100 of the present exemplary embodiment may take a so-called see-through configuration which enables a driver to visually recognize the rear side of the vehicle through the extending regions of the light guiding units 106 and the light emitting units 108.

One end of the light guiding unit 106 is disposed in the vicinity of the semiconductor light-emitting element 6 and the other end is disposed in the vicinity of the light emitting unit 108. In the light guiding unit 106, a plurality of light incident steps 110 are formed on the surface of the front side of the vehicle (the vehicle interior side or vehicle compartment side) of the corresponding one end of the light guiding unit 106. The light incident steps 110 are provided in a region where the light radiated from the semiconductor light-emitting element 6 and the rear window part 104 overlap. The light from the source light is refracted by the light incident steps 110 and collected inside of the light guiding unit 106. Therefore, the above-mentioned one end of the light guiding unit 106 forms a light incident part. The light collected inside of the light guiding unit 106 proceeds toward the other end inside of the light guiding unit 106 while being reflected from the inner side surface of the vehicle and outer side surface of the vehicle of the light guiding part 106 (in other words, the rear window part 104) and reaches the light emitting unit 108. The light emitting unit 108 is provided with a plurality of light emitting steps 112 formed on the inner side surface of the vehicle of the rear window part 104. The light reaching the light emitting unit 108 is caused to proceed toward the rear side of the vehicle by the light emitting steps 112 and is emitted from the outer side surface of the vehicle of the light emitting unit 108 toward the rear side of the vehicle. Also, the region of the light emitting unit 108 closer to the semiconductor light-emitting element 6 serves as a light guide i.e., as the light guiding unit 106 configured to cause the light from the light source to proceed to a farther region. When viewed from the exterior side of the vehicle_1, the extending region of the light emitting unit 108 forms a light emitting portion.

In the present exemplary embodiment, the semiconductor light-emitting element 6 emits red light. The light guiding unit 106 and the light emitting unit 108 serve as a stop lamp and/or a tail lamp as a vehicle beacon lamp. Also, the semiconductor light-emitting element 6 may emit amber light and the light guiding unit 106 and the light emitting unit 108 may serve as a turn signal lamp. Further, when the vehicular rear panel 100 is in a closed state, the light emitted from the semiconductor light-emitting element 6 is radiated to the rear side of the vehicle via the light guiding unit 106 and the light emitting unit 108, thereby serving as a vehicle beacon lamp. Meanwhile, when the vehicular rear panel 100 is in an open state, the light emitted from the semiconductor light-emitting element 6 is directly radiated to the rear side of the vehicle, thereby serving as a vehicle beacon lamp.

As described above, the vehicular rear panel 100 of the present exemplary embodiment includes a light guiding unit 106 configured to guide the light from the light source along the extending direction of the vehicular rear panel 100 and a light emitting unit 108 configured to emit the light inside of the light guiding unit 106 to the rear of the vehicle. That is, the vehicular rear panel 100 of the present exemplary embodiment has a configuration in which a vehicular lamp is integrally provided. Accordingly, the vehicular rear panel 100 with a new configuration may be provided. Also, according to the vehicular rear panel 100 of the present exemplary embodiment, for example, the number of components, the number of assembling steps and the manufacturing cost of the vehicular rear panel or the vehicle may be reduced since configurations and members required to attach the vehicular lamp to the backdoor or the vehicle body may be omitted.

In addition, in the present exemplary embodiment, the rear window part 104 is made of a resin material. Thus, weight lightening of the vehicular rear panel 100 may be further facilitated. Further, since the backdoor outer panel 102a and/or the backdoor inner panel 102b and the rear window part 104 may be integrally formed, the number of components, the number of assembling steps, and the manufacturing cost of the vehicular rear panel may be further reduced. Furthermore, the rear window part 104 may be simply formed with the light guiding unit 106 and the light emitting unit 108 since the rear window part 104 may be easily processed. Also, in the present exemplary embodiment, the light guiding unit 106 and the light emitting unit 108 are provided on the rear window part 104. Accordingly, the layout flexibility of the vehicular lamp or the design flexibility of the vehicle may be enhanced and the decorativenss of the vehicular rear panel 100 may be also enhanced. Further, one end of the light guiding unit 106 is disposed in the vicinity of the light source installed on the vehicle body and the other end is disposed in the vicinity of the light emitting unit 108. Therefore, since the light emitting unit 108, i.e., luminous part may be separated, the layout flexibility of the vehicular lamp or the design flexibility of the vehicle and the decorativenss of the vehicular rear panel 100 may be further enhanced.

As for the vehicular rear panel 100 according to the above-described first exemplary embodiment, for example, modified examples 1 to 7 described below may be exemplified.

MODIFIED EXAMPLE 1

Figure 2A:
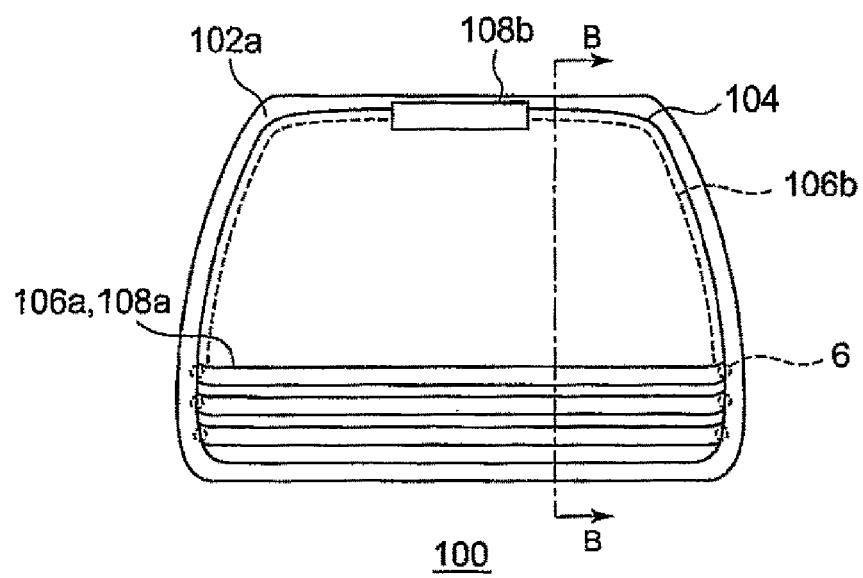
FIG. 2A is a schematic front view illustrating a configuration of a vehicular rear panel according to a modified example 1.
Figure 2B:
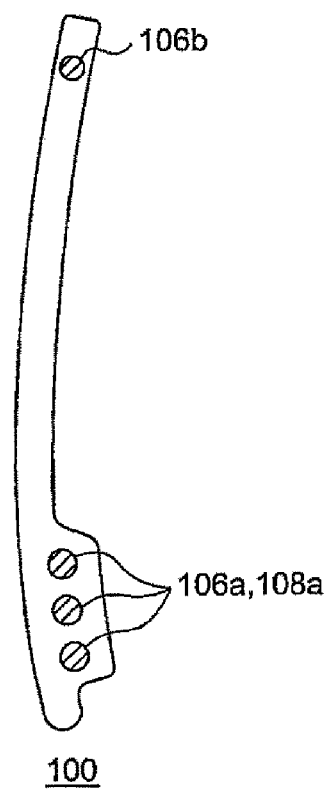
FIG. 2B is a cross-sectional view taken along line B-B in FIG. 2A.

FIG. 2A is a schematic front view illustrating a configuration of the vehicular rear panel 100 according to the modified example 1. FIG. 2B is a cross-sectional view taken along line B-B in FIG. 2A. Also, the rear vehicle body part 2 is omitted in FIG. 2A. The vehicular rear panel 100 according to the modified example 1 is provided with a light guiding unit 106 formed by a light guiding member such as, for example, an optical fiber. For example, through gas assist molding, the rear window part 104 is formed which has a cavity in a region where the light guiding unit 106 is to be provided. The light guiding member is inserted into the cavity and the light guiding unit 106 is formed by the light guiding member.

In the present example, the vehicular rear panel 100 is provided with a light guiding unit 106a configured to extend to the horizontal direction at the lower part of the vehicular rear panel 100 and a light guiding unit 106b configured to extend upward along the peripheral edge portion of the rear window part 104 and reach the upper center of the vehicular rear panel 100. A roughening processing such as, for example, a surface texturing processing is conducted on the light guiding member of the light guiding unit 106a and the light inside of the light guiding unit 106 is reflected from the roughened surface and radiated to the rear of the vehicle. Also, the cavity part provided with the rear window part 104 may be the light guiding unit 106a. In this case, the roughening processing is conducted on the surface of the rear window part 104 which forms the contour of the cavity part and the roughened surface forms a light emitting unit 108a.

One end of the light guiding unit 106a is disposed in the vicinity of the semiconductor light-emitting element 6 installed on the rear vehicle body part 2 (See, e.g., FIG. 1B) and the other end is disposed in the vicinity of the light emitting unit 108b provided at the upper center of the vehicular rear panel 100. The light emitted from the semiconductor light-emitting element 6 passes through the inside of the light guiding unit 106, reaches the light emitting unit 108b, and is radiated to the rear side of the vehicle. The light guiding unit 106b and the light emitting unit 108b may serve as a high mount stop lamp.

Modified Example 2

Figure 3A:
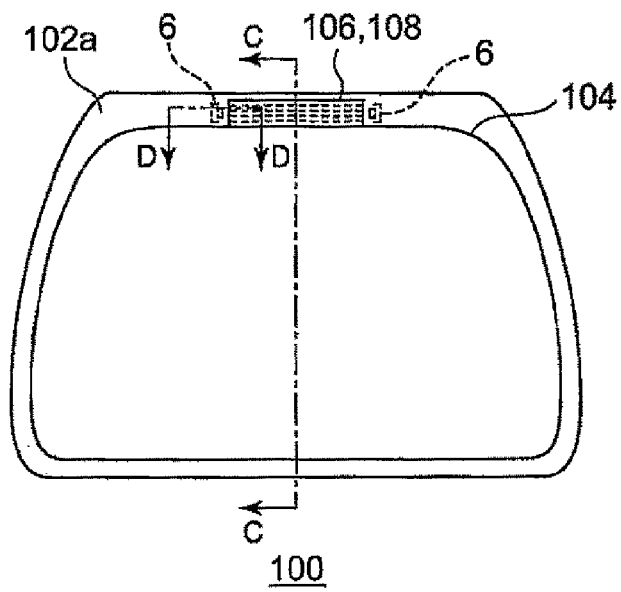
FIG. 3A is a schematic front view illustrating a configuration of a vehicular rear panel according to a modified example 2.
Figure 3B:
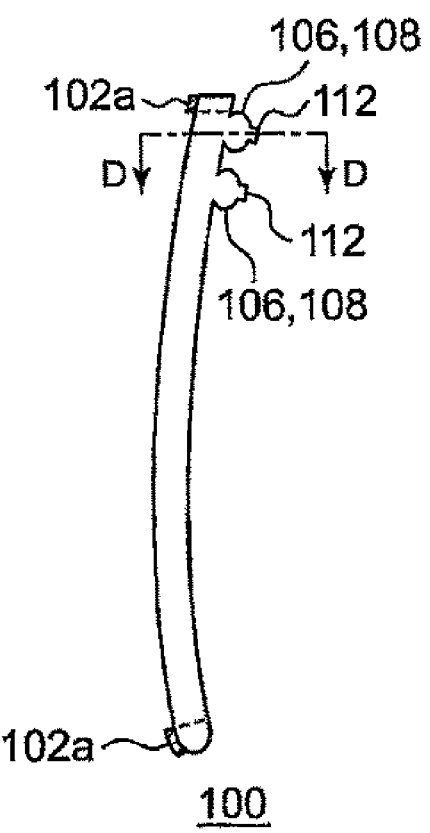
FIG. 3B is a cross-sectional view taken along line C-C in FIG. 3A.
Figure 3C:
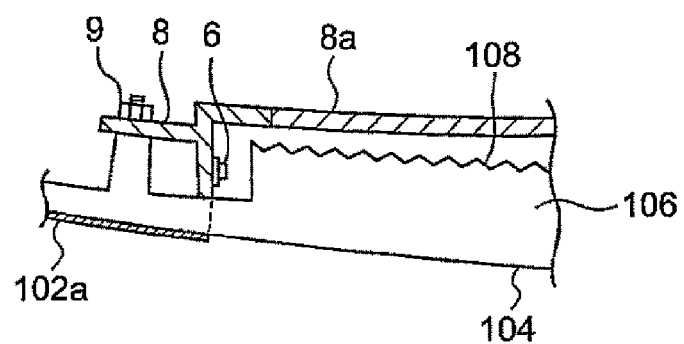
FIG. 3C is a cross-sectional view taken along line D-D in FIGS. 3A and 3B.

FIG. 3A is a schematic front view illustrating a configuration of the vehicular rear panel according to the modified example 2. FIG. 3B is a cross-sectional view taken along line C-C in FIG. 3A. FIG. 3C is a cross-sectional view taken along line D-D line in FIGS. 3A and 3B. Also, the rear vehicle body part 2 is omitted in FIG. 3A. The vehicular rear panel 100 according to the modified example 2 is provided with the light guiding unit 106 and the light emitting unit 108 which serve as a high mount stop lamp at the upper center. In the present example, a transparent cylindrical member forms the light guiding unit 106 and the light emitting unit 108. The cylindrical member is integrally formed on the surface of the vehicle interior side of the rear window part 104 and disposed such that it extends in the widthwise direction of the vehicle. A plurality of light emitting steps 112 are formed on the inner side surface of the vehicle of the cylindrical member. The semiconductor light-emitting element 6 is disposed at each of left and right ends of the cylindrical member such that the light is radiated toward the cylindrical member. The semiconductor light-emitting element 6 is attached to a heat sink 8 having a cover 8a. The cover 8a is disposed at the front side of the vehicle of the cylindrical member which forms the light guiding part 106 and the light emitting part 108. The cover 8a serves as a light shielding part which suppresses the light from the light source from proceeding to the front side of the vehicle. In a configuration in which red light is emitted from the light emitting unit 108, the radiation of the red light to the front side of the vehicle may cause, for example, a pedestrian or a driver of another vehicle to misunderstand the longitudinal direction of the vehicle. By providing the light shielding part, this misunderstanding may be avoided.

The heat sink 8 is attached to the backdoor outer panel 102a by a fastening member 9 such as, for example, a screw. In the present modified example, the backdoor outer panel 102a and the rear window part are integrally formed. For example, by a molding method such as, for example, two-color molding, a single piece product may be obtained in which a panel body made of a transparent resin material and a frame made of a colored, e.g., black resin material are integrally formed. In the single piece product, the frame installed portion forms the backdoor outer panel 102a and the other region forms the rear window part 104.

Modified Example 3

Figure 4A:
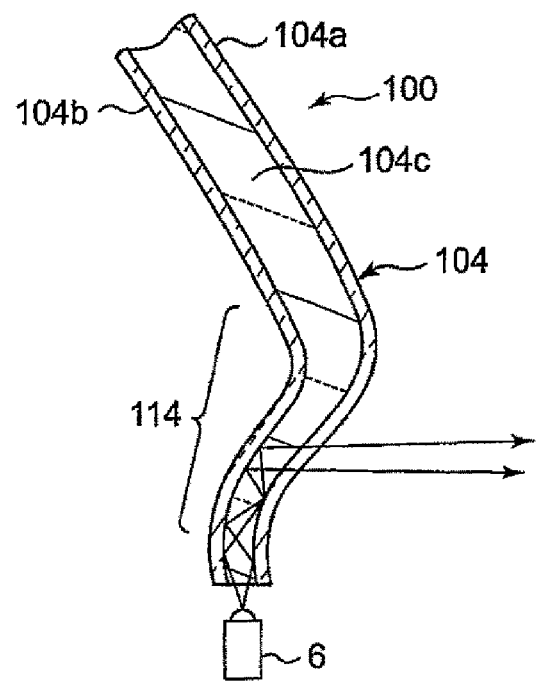
FIG. 4A is a vertical cross-sectional view of a vehicular rear panel according to a modified example 3 in the vicinity of a luminous part.

FIG. 4A is a vertical cross-sectional view of the vehicular rear panel according to the modified example 3 in the vicinity of a light emitting unit. The vehicular rear panel 100 according to the modified example 3 is provided with the rear window part 104 formed by stacking a rear window outer part 104a, a rear window inner part 104b and a middle part 104c interposed between them. The rear window outer part 104a, the rear window inner part 104b, and the middle part 104c are made of a transparent resin material. Also, the middle part 104c is made of a resin material of which the refractive index is different from those of the rear window outer part 104a and the rear window inner part 104b. Further, the rear window part 104 is provided with an inclined surface part 114 which is curved in the longitudinal direction of the vehicle and intersects the proceeding direction of the light from the light source at an angle not less than a predetermined angle.

The semiconductor light-emitting element 6 is disposed at one end side of the rear window part 104. The light emitted from the semiconductor light-emitting element 6 is incident on the middle part 104c from the surface of the above-mentioned one end side of the rear window part 104. The light incident on the middle part 104c is reflected from the interface of the rear window outer part 104a and the middle part 104c and the interface of the rear window inner part 104b and the middle part 104c and proceeds to the extending direction of the rear window part 104 inside of the middle part 104c. At the inclined surface part 114, the light is directed toward the rear side of the vehicle and radiated to the rear side of the vehicle through the middle part 104c and the rear window outer part 104a. Since the curved portion of the rear window is used for the light emitting unit 108 as described above, the configuration of the vehicular rear panel 100 may be simplified. Also, the middle part 104c may be a cavity, i.e., an air layer. In this case, a heat insulation property may be provided to the rear window part 104 and thus, for example, blurriness, condensation and freeze may be suppressed and a defogger may be omitted.

Modified Example 4

Figure 4B:
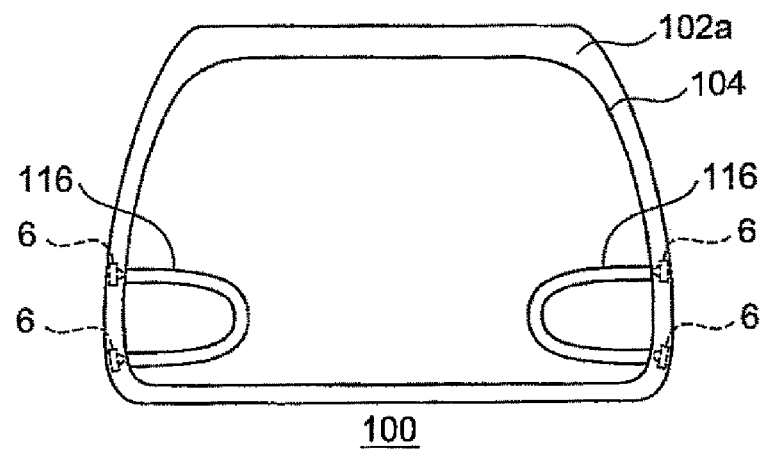
FIG. 4B is a schematic front view illustrating a configuration of a vehicular rear panel according to a modified example 4.

FIG. 4B is a schematic front view illustrating a configuration of the vehicular rear panel according to the modified example 4. The vehicular rear panel 100 according to the modified example 4 has a substantially U-shaped light guiding member embedded to the rear window part 104. Optical diffusion particles may be mixed in the light guiding unit 116 to receive the light emitted from the semiconductor light-emitting element 6 and emit light uniformly. Therefore, the light guiding member 116 forms the light guiding unit 106 and light emitting unit 108. The light guiding member 116 entirely emits light when the light from the light source is incident from both ends or one end thereof.

Modified Example 5

Figure 4C:
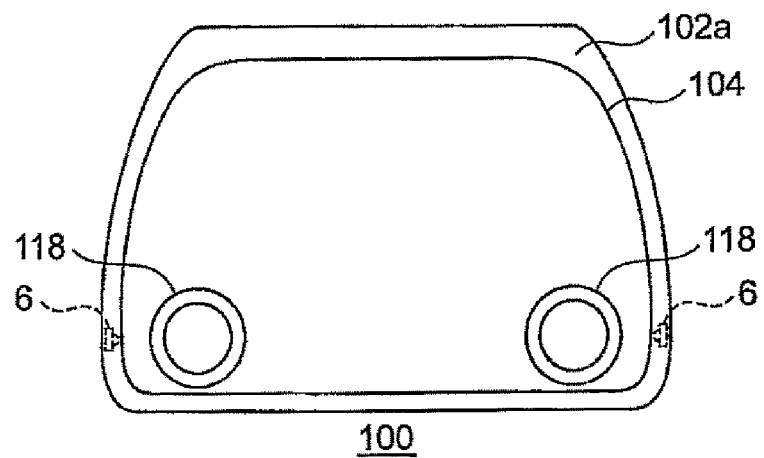
FIG. 4C is a schematic front view illustrating a configuration of a vehicular rear panel according to a modified example 5.

FIG. 4C is a schematic front view illustrating a configuration of the vehicular rear panel according to the modified example 5. The vehicular rear panel 100 according to the modified example 5 has a ring-shaped light guiding member 118 embedded to the rear window part 104. Fluorescent substances are mixed in the light guiding member 118 to receive the light emitted from the semiconductor light-emitting element 6 and emit light. Therefore, the light guiding member 118 forms the light guiding unit 106 and the light emitting unit 108. The light guiding member 118 is disposed at a position where the rear window part 104 is interposed between the semiconductor light-emitting element 6 and the light guiding member 118 and emits light entirely when the light radiated from the semiconductor light-emitting element 6 passes the inside of the rear window part 104 and reaches the light guiding member 118. For example, the semiconductor light-emitting element 6 emits ultraviolet light or blue light and the light of which wavelength is converted by the fluorescent substances of the light guiding member 118 is radiated to the rear side of the vehicle.

Modified Example 6

Figure 5A:
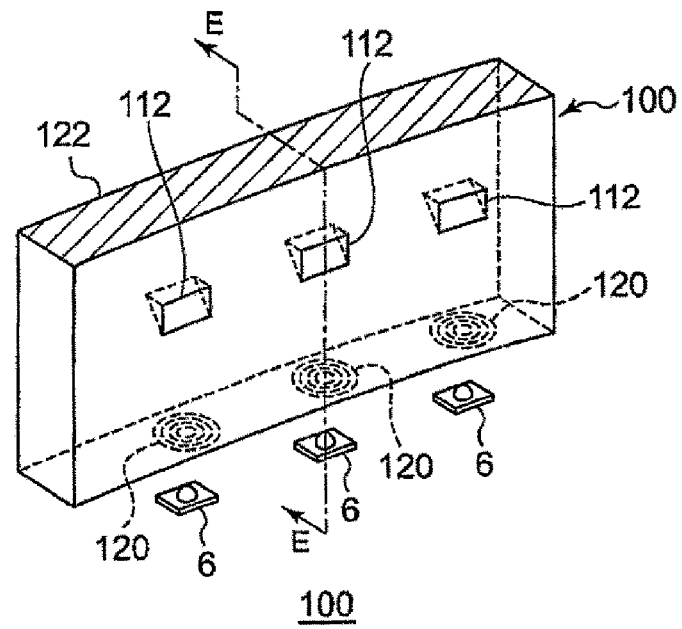
FIG. 5A is a schematic perspective view illustrating a configuration of a portion of a vehicular rear panel according to a modified example 6.
Figure 5B:
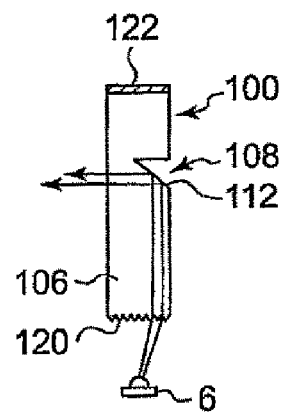
FIG. 5B is a cross-sectional view taken along line E-E in FIG. 5A.

FIG. 5A is a schematic perspective view illustrating a portion of the vehicular rear panel according to the modified example 6. FIG. 5B is a cross-sectional view taken along line E-E in FIG. 5A. Also, FIG. 5A illustrates a state in which the vehicular rear panel 100 is viewed from the front side of the vehicle. The vehicular rear panel 100 according to the modified example 6 is provided with Fresnel steps 120 at the end surface opposed to the semiconductor light-emitting element 6. Further, the principal surface of one side of the panel is cut out to form the light emitting steps 112. The end surface provided with the Fresnel steps 120 corresponds to one end of the light guiding unit 106. The light emitting steps 112 formed region on the panel corresponds to the light emitting unit 108. The light emitted radially from the semiconductor light-emitting element 6 is formed into parallel lights by the Fresnel steps 120 which proceed in the inside of the light guiding unit 106 and are reflected toward the rear side of the vehicle by the light emitting steps 112 of the light emitting unit 108.

In the present modified example, total reflection steps configured to cause substantially all the light which reaches the light emitting steps 112 to be radiated to the rear side of the vehicle are formed by the combination of the Fresnel steps 120 and the light emitting steps 112. Accordingly, the radiation of the light from the light source toward a driver may be suppressed. Also, the Fresnel steps 120 formed end surface of the vehicular rear panel 100 opposed to the end surface is provided with a light shielding layer 122 configured to suppress the leakage of light. The light shielding layer 122 is formed by, for example, applying colored paint. Further, although FIG. 5A illustrates a configuration in which three semiconductor light-emitting elements 6, three Fresnel steps 120, and three light emitting steps 112 are arranged in the horizontal direction respectively, the number and the arrangement of each component are not limited thereto.

Modified Example 7

Figure 5C:
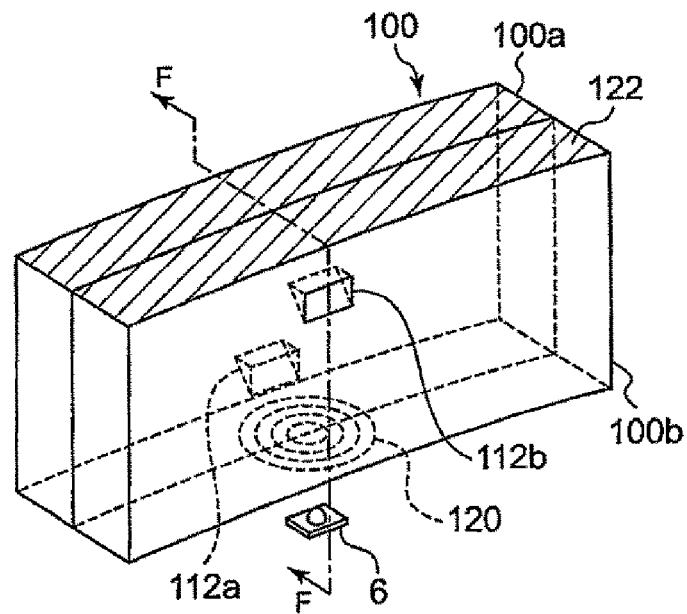
FIG. 5C is a schematic perspective view illustrating a configuration of a portion of a vehicular rear panel according to a modified example 7.
Figure 5D:
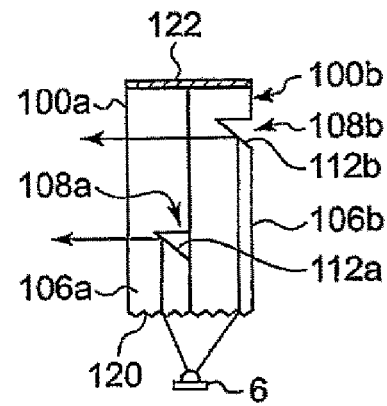
FIG. 5D is a cross-sectional view taken along line F-F in FIG. 5C.

FIG. 5C is a schematic perspective view illustrating a configuration of a portion of the vehicular rear panel 100 according to the modified example 7. FIG. 5D is a cross-sectional view taken along line F-F in FIG. 5C. Also, FIG. 5C illustrates a state in which the vehicular rear panel 100 is viewed from the front side of the vehicle. The vehicular rear panel 100 according to the modified example 7 has a configuration in which a first panel 100a and a second panel 100b disposed closer to the front side of the vehicle than the first panel 100a are stacked one another. Each of the first panel 100a and the second panel 100b is provided with a Fresnel step 120, a light emitting step 112a/112b, a light guiding unit 106a/106b, a light emitting unit 108a/108b and a light shielding layer 122 as in the modified example 6. The light emitting step 112a provided in the first panel 100a and the light emitting step 112b provided in the second panel 100b are disposed to be offset in the principal surface direction of the panel. Accordingly, a feeling of visual depth and a three-dimensional effect may be obtained.

Further, the number and the arrangement of the semiconductor light-emitting element 6, the Fresnel step 120, and light emitting steps 112a/112b are not limited to those illustrated in FIG. 5C. For example, the light emitting step 112a and the light emitting step 112b may be provide with semiconductor light-emitting elements 6 to radiate different colored lights, respectively. The light emitting steps 112a and 112b may be superimposed to combine the light radiations from emitting steps 112a and 112b. Therefore, according to the present modified example, a vehicular lamp with various configurations may be obtained.

[Second Exemplary Embodiment]

The vehicular rear panel according to the second exemplary embodiment is provided with a light shielding part configured to suppress the light from the light source from proceeding toward the front side of the vehicle. Hereinafter, descriptions about the vehicular rear panel 100 according to the present exemplary embodiment will be made based on the features different from those of the first exemplary embodiment. Also, the same configurations as those of the first exemplary embodiment will be assigned with the same symbols and the descriptions and illustrations of the configurations and the effects will be omitted.

Figure 6:
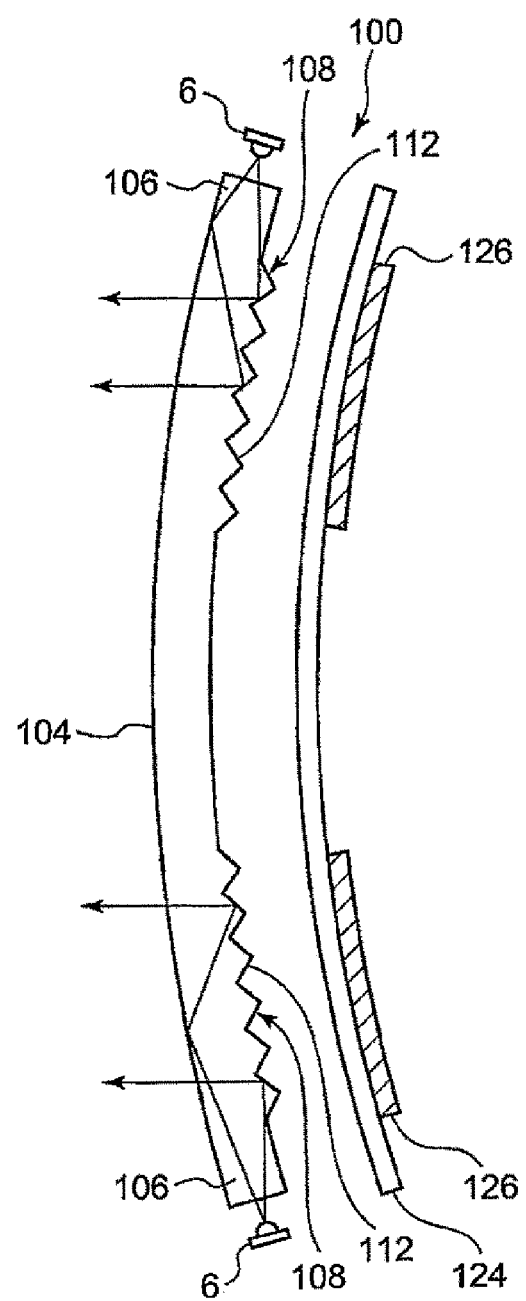
FIG. 6 is a schematic cross-sectional view illustrating a configuration of a vehicular rear panel according to a second exemplary embodiment.

FIG. 6 is a schematic cross-sectional view illustrating a configuration of the vehicular rear panel 100 according to the second exemplary embodiment. The vehicular rear panel 100 according to the present exemplary embodiment is formed with a light guiding unit 106 and a light emitting unit 108 by a portion of the rear window part 104. The light emitted from the semiconductor light-emitting element 6 is incident on the interior of the light guiding unit 106 from an end portion of the light guiding unit 106. The light incident on the interior of the light guiding unit 106 is guided along the extending direction of the rear window part 104 inside of the light guiding unit 106 and reaches the light emitting unit 108. The light emitting unit 108 is provided with light emitting steps 112 and the light reaching the light emitting unit 108 is directed toward the rear side of the vehicle by the light emitting steps 112. The light from the light source is radiated from the light emitting unit 108 to the rear side of the vehicle. A supporting plate 124 formed from a transparent material is provided on the surface of the front side of the vehicle of the rear window part 104. At the predetermined location of the supporting plate 124, i.e., a region where the supporting plate 124 and the light emitting unit 108 overlap each other when viewed from the front side of the vehicle, a liquid crystal shutter 126 configured to suppress the light from the light source from proceeding to the front side of the vehicle is provided.

The liquid crystal shutter 126 is turned ON in a state where the semiconductor light-emitting element 6 is ON and the penetration amount of the light decreases. Especially, in a configuration in which red light is emitted from the light emitting unit 108, it is preferable that substantially all the light is shielded to an extent where, for example, a pedestrian is not capable of seeing the light to suppress the misunderstanding of the above-described longitudinal direction of the vehicle. Also, the liquid crystal shutter 126 is turned off in a state where the semiconductor light-emitting element 6 is OFF and the penetration amount of the light increases. For example, the liquid crystal 126 becomes transparent when the semiconductor light-emitting element 6 is OFF. Accordingly, a see-through configuration in which light may be suppressed from being radiated to the front side of the vehicle when the light emitting unit 108 is serving as a beacon lamp and a driver is able to visually recognize the rear side of the vehicle when the light emitting unit 108 is not serving as a beacon lamp may be obtained.

[Third Exemplary Embodiment]

The vehicular rear panel 100 according to the third exemplary embodiment has a rear window part 104 is provided with a light guiding unit 106 and a light emitting unit 108 at a curved portion of the rear window part. Hereinafter, descriptions about the vehicular rear panel according to the present exemplary embodiment will be made based on the features different from those of the first exemplary embodiment. Also, the same configurations as those of the first exemplary embodiment will be assigned with the same symbols and the descriptions and illustrations of the configurations and the effects will be omitted.

Figure 7A:
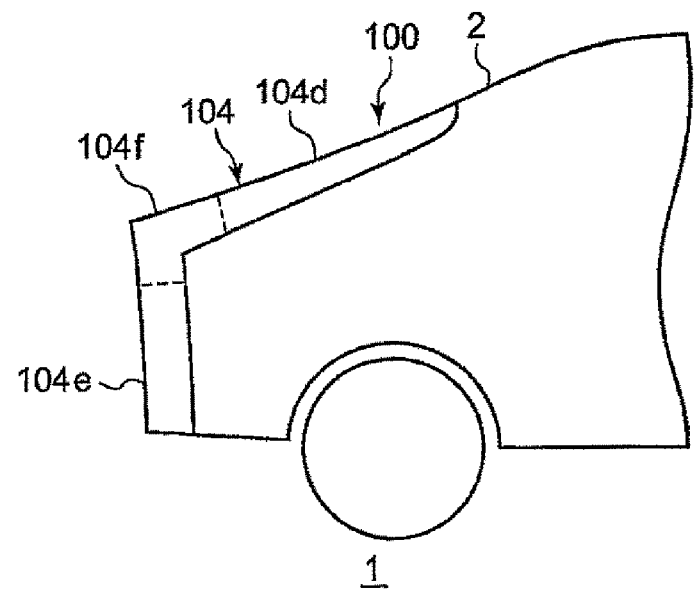
FIG. 7A is a schematic side view illustrating a configuration of the rear part of the vehicle on which a vehicular rear panel according to a third exemplary embodiment is mounted.
Figure 7B:
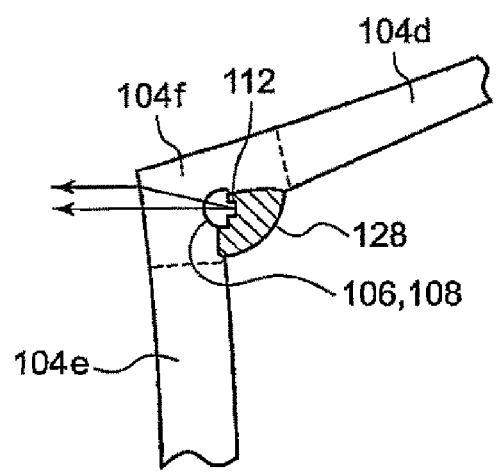
FIG. 7B is a schematic vertical cross-sectional view illustrating a configuration in the vicinity of a curved portion of a rear window part.
Figure 7C:
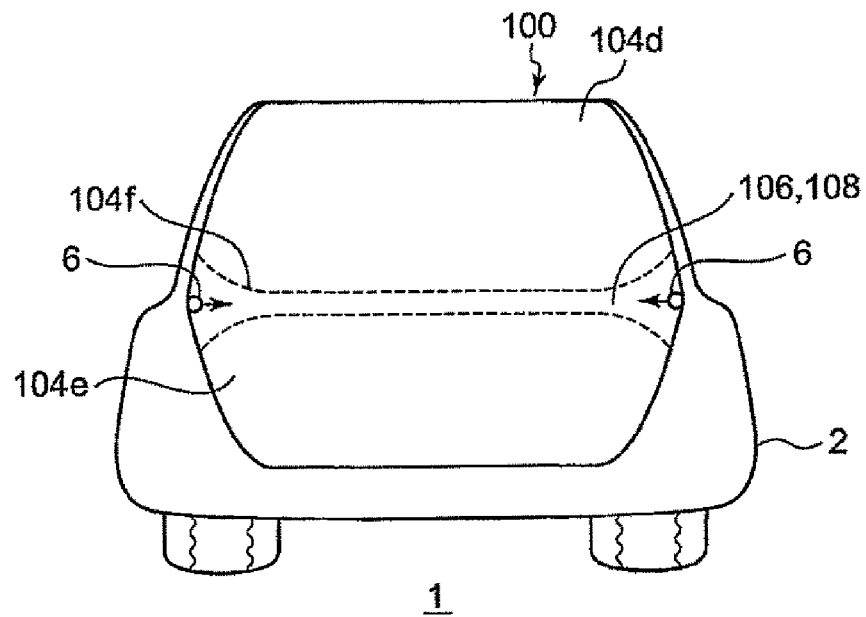
FIG. 7C is a schematic front view illustrating a configuration of a vehicular rear panel according to a third exemplary embodiment.

FIG. 7A is a schematic side view illustrating a configuration of the rear part of the vehicle on which the vehicular rear panel 100 according to the third exemplary embodiment is mounted. FIG. 7B is a schematic vertical cross-sectional view illustrating a configuration in the vicinity of the curved portion of a rear window part 104. FIG. 7C is a schematic front view illustrating a configuration of the vehicular rear panel 100 according to the third exemplary embodiment. The vehicular rear panel 100 according to the third exemplary embodiment includes the rear window part 104 which is formed with a first rear window part 104d and a second rear window part 104e. The first rear window part 104d inclines at a predetermined angle such that the height of the vehicle is gradually lowered from the front side of the vehicle toward the rear side of the vehicle of the rear vehicle body part 2. The second rear window part 104e extends from the end portion of the rear side of the vehicle of the first rear window part 104d with steeper inclination than that of the first rear window part 104d. In the present exemplary embodiment, the second rear window part 104e extends in the downward vertical direction from the end portion of the rear side of the vehicle of the first rear window part 104d. Also, the second rear window part 104e may extend to the rear side of the vehicle with steeper inclination than that of the first rear window part 104d and may be folded toward the front side of the vehicle. A connecting part of the first rear window part 104d and the second window part 104e forms a curved portion 104f. The curved portion 104f is a region where the scenery becomes discontinuous when viewed from a driver.

A light guiding unit 106 and a light emitting unit 108 are provided at the curved portion 104f. In the present exemplary embodiment, the curved portion 104f extends in the widthwise direction of the vehicle and a cylindrical light guiding member (e.g., optical fiber) in which light emitting steps 112 are formed is embedded in the curved portion 104f, thereby forming the light guiding unit 106 and the light emitting unit 108. Therefore, the light guiding unit 106 and the light emitting unit 108 extend in the widthwise direction of the vehicle. A semiconductor light-emitting element 6 is installed on the rear vehicle body part 2 in the vicinity of each of the left and right end portions of the curved part 104f. The light radiated from the semiconductor light-emitting elements 6 is guided to the center side of the curved part 104f by the light guiding unit 106 and radiated to the rear side of the vehicle from the light emitting unit 108 as well. Also, the semiconductor light-emitting element 6 may be provided only at one end side. A light shielding part 128 is provided at the front side of the vehicle of the light emitting unit 108. The vehicular rear panel 100 according to the present exemplary embodiment uses the curved part 104f, which is difficult to be used for a driver's rear visibility of the vehicle, for the region where the light guiding unit 106 and the light emitting unit 108 are provided. Accordingly, the deterioration of a driver's rear visibility caused by providing the light guiding unit 106 and the light emitting unit 108 on the rear window part 104 may be suppressed.

[Fourth Exemplary Embodiment]

In the vehicular rear panel 100 according to the fourth exemplary embodiment, the light guiding unit 106 and the light emitting unit 108 have different configurations. Hereinafter, descriptions about the vehicular rear panel 100 according to the present exemplary embodiment will be made based on the features different from those of the first exemplary embodiment. Also, the same configurations as those of the first exemplary embodiment will be assigned with the same symbols and the descriptions and illustrations of the configurations and the effects will be omitted.

Figure 8A:
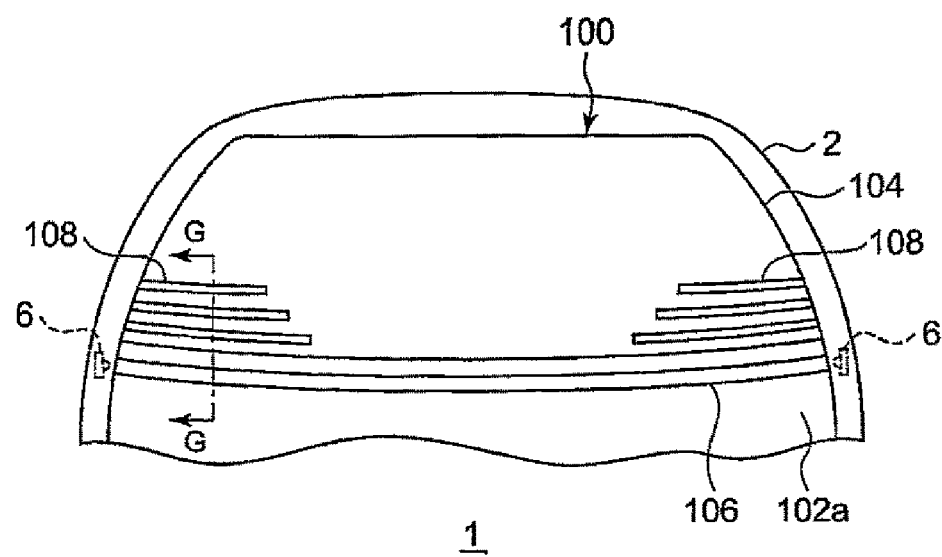
FIG. 8A is a schematic front view illustrating a configuration of a vehicular rear panel according to a fourth exemplary embodiment.
Figure 8B:
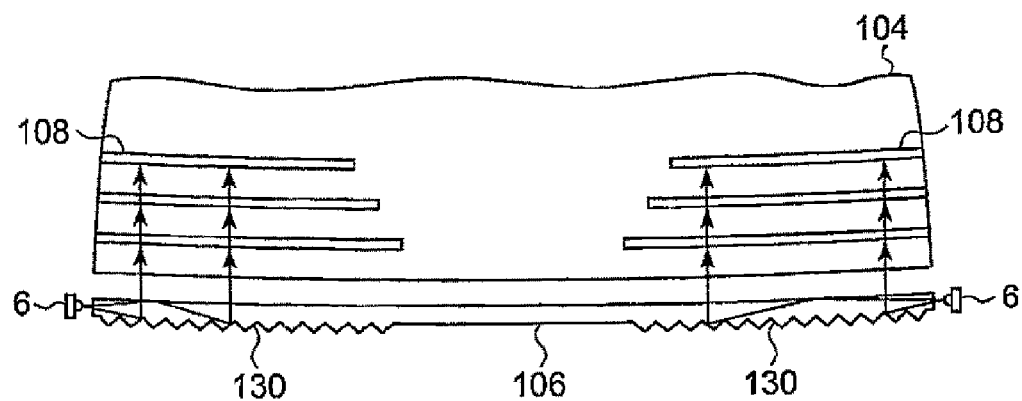
FIG. 8B is a schematic front view illustrating a configuration the vehicular rear panel in the vicinity of a luminous part.
Figure 8C:
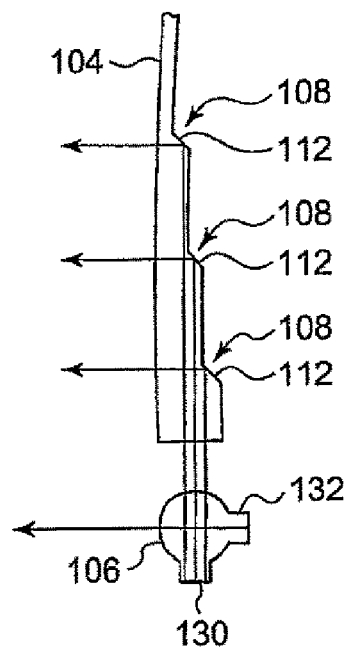
FIG. 8C is a cross-sectional view taken along line G-G in FIG. 8A.

FIG. 8A is a schematic front view illustrating a configuration of the vehicular rear panel 100 according to the fourth exemplary embodiment. FIG. 8B is a schematic front view illustrating a configuration in the vicinity of a luminous part of the vehicular rear panel 100. FIG. 8C is a cross-sectional view taken along line G-G in FIG. 8A. The vehicular rear panel 100 according to the fourth exemplary embodiment is provided with a cylindrical light guiding member such as, for example, an optical fiber disposed at a location below the rear window part 104 and spaced apart from the rear window part 104 and a light guiding unit 106 is formed by the above-described light guiding member. In addition, the light guiding unit 106 extends in the widthwise direction of the vehicle and a semiconductor light-emitting element 6 is disposed in the vicinity of each of the left and right end portions of the light guiding unit 106. A plurality of light emitting steps 130 are provided on the bottom surface of the light guiding unit 106. Also, a plurality of light emitting steps 132 are provided on the surface of the front side of the vehicle of the light guiding unit 106.

The light emitted from the semiconductor light-emitting element 6 is incident on the end portion surface and proceeds in the widthwise direction of the vehicle in the inside of the light guiding unit 106. The proceeding direction of the light is directed upward by the light emitting steps 130 and the light is radiated from the light guiding unit 106. The rear panel part interposed between the light guiding unit 106 and the rear window part 104 is transparent. Therefore, the light radiated upward from the light guiding unit 106 reaches the rear window part 104. In addition, a portion of the light inside of the light guiding unit 106 is directed toward the rear of the vehicle by the light emitting steps 132 and radiated from the light guiding unit 106 to the rear side of the vehicle. Therefore, the light guiding member forming the light guiding unit 106 also forms a light emitting unit 108.

A plurality of light emitting steps 112 are formed on the surface of the front side of the vehicle of the rear window part 104. In the present exemplary embodiment, the light emitting steps 112 are formed by the step parts formed by reducing the thickness of the rear window part 104 step by step. Also, in the present exemplary embodiment, three light emitting steps 112 extending in the widthwise direction of the vehicle, i.e., extending in parallel to the light guiding unit 106 are arranged in the vertical direction at each of left and right sides of the lower region of the rear window part 104. The region of the rear window part 104 where the light emitting steps 112 are provided forms light emitting units 108. The light radiated upward from the light guiding unit 106 by the light emitting steps 130 proceeds upward in the inside of the rear window part 104 and reaches each light emitting unit 108. The light reaching each light emitting unit 108 is directed toward the rear side of the vehicle by the light emitting steps 112 and radiated from the light emitting unit 108 to the rear side of the vehicle.

In the present exemplary embodiment, the light of the semiconductor light-emitting element 6, i.e., a dot-shaped light is converted into a line-shaped light by passing through the light guiding unit 106 and the line-shaped light is radiated to the rear side of the vehicle from each light emitting unit 108. Thus, a line-shaped light emitting part formed by the light emitting unit 108 may emit light more uniformly. Also, the light guiding unit 106 may be divided into two left and right parts. For example, the number, the shape, and the arrangement of the light emitting units 108 are not limited. For example, the light emitting units 108 may have a shape such as, for example, a letter or a figure.

The vehicular rear panel 100 according to the above-described fourth exemplary embodiment uses the step parts formed by reducing the thickness of the rear window part 104 step by step as the light emitting steps 112. However, the configuration of the vehicular rear panel 100 is not limited thereto and it may have, for example, a configuration according to a modified example 8 described below.

Modified Example 8

Figure 9:
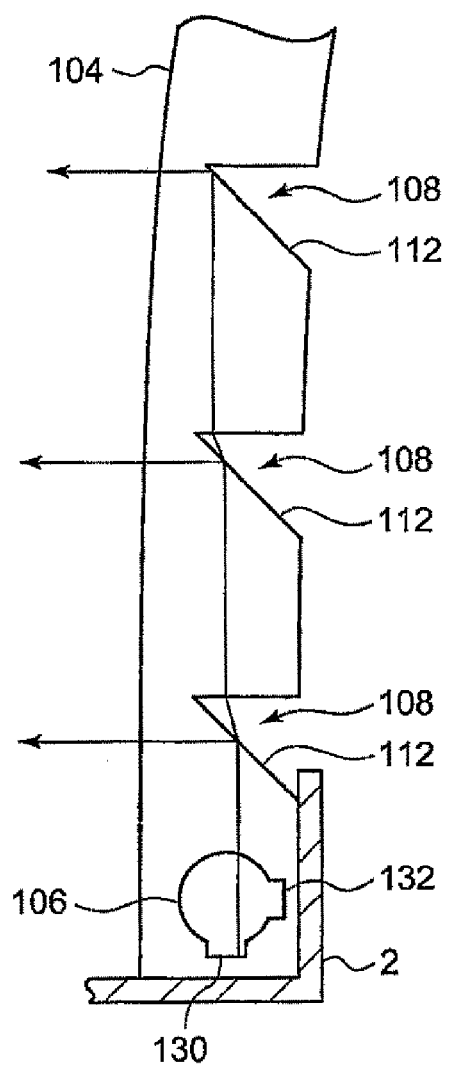
FIG. 9 is a schematic vertical cross-sectional view illustrating a configuration of a vehicular rear panel according to a modified example 8 in the vicinity of a luminous part.

FIG. 9 is a schematic vertical cross-sectional view illustrating a configuration the vehicular rear panel according to the modified example 8 in the vicinity of the luminous part. The vehicular rear panel 100 according to the modified example 8 is provided with light emitting steps 112 which are formed by cutting out the surface of the front side of the vehicle of the rear window part 104. In this case, although a portion of the light radiated upward from the light guiding unit 106 is reflected to the rear side of the vehicle by the light emitting steps 112 located at the lower part, the remaining portion of the light radiated upward from the light guiding unit 106 proceeds further upward through the light emitting steps 112. The light proceeding upward is reflected to the rear side of the vehicle from the light emitting steps 112. Accordingly, the leakage of the light toward the front side of the vehicle may be suppressed. In addition, in the present modified example, the light guiding unit 106 is embedded in the interior of the rear window part 104. Further, the rear vehicle body part 2 is disposed in the region of the front side of the vehicle of the light guiding unit 106.

[Fifth Exemplary Embodiment]

The vehicular rear panel 100 according to the fifth exemplary embodiment is provided with a prism part serving as the light guiding unit 106 and the light emitting unit 108. Hereinafter, descriptions about the vehicular rear panel 100 according to the present exemplary embodiment will be made based on the features different from those of the first exemplary embodiment. Also, the same configurations as those of the first exemplary embodiment will be assigned with the same symbols and the descriptions and illustrations of the configurations and the effects will be omitted.

Figure 10A:
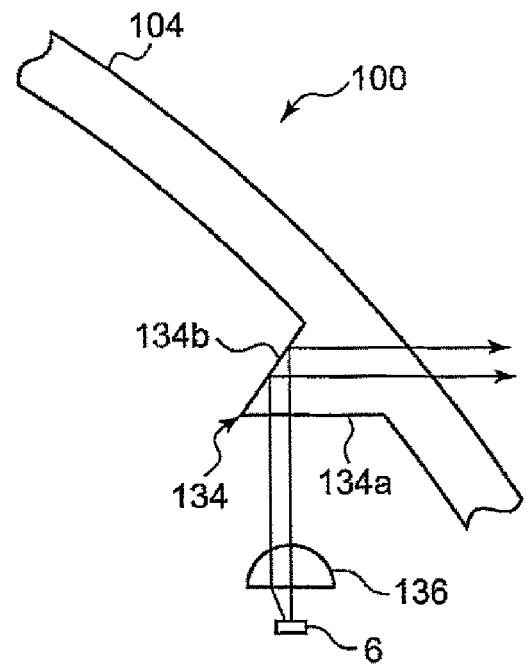
FIG. 10A is a schematic vertical cross-sectional view illustrating a configuration of a vehicular rear panel according to a fifth exemplary embodiment in the vicinity of a luminous part.

FIG. 10A is a schematic vertical cross-sectional view illustrating a configuration the vehicular rear panel according to the fifth exemplary embodiment in the vicinity of a luminous part. The vehicular rear panel 100 according to the fifth exemplary embodiment is provided with a prism part 134 which protrudes to the front side of the vehicle and integrally formed on the surface of the front side of the vehicle of the rear window part 104. The prism part 134 is formed with a bottom surface 134a extending in the substantially horizontal direction and an inclined surface 134b extending obliquely upward from the end portion of the front side of the vehicle of the bottom surface 134a toward the rear side of the vehicle. The semiconductor light-emitting element 6 is fixed to, for example, the rear vehicle body part 2 (not illustrated) such that the light emitting surface thereof faces upward under the prism part 134. A lens 136 is provided between the semiconductor light-emitting element 6 and the prism part 134. The light emitted from the semiconductor light-emitting element 6 is formed into parallel lights by the lens 136 and incident to the inside of the prism part 134 from the bottom surface 134a. The light incident on the inside of the prism part 134 is directed toward the rear of the vehicle by the inclined surface 134b and radiated from the surface of rear side of the vehicle. Therefore, the prism part 134 forms a light guiding unit 106 and a light emitting unit 108.

In the vehicular rear panel 100 according to the present exemplary embodiment, the rear window part 104 is made of a resin material. Thus, the prism part 134 may be simply installed. Also, total reflection step is formed by the combination of the lens 136 and the prism part 134. Accordingly, the radiation of the light from the light source toward a driver may be suppressed. Further, since the semiconductor light-emitting element 6 is installed on the vehicle body side, the formation of electrical wiring to, for example, the rear window part 104 may be avoided.

As for the vehicular rear panel 100 according to the above-described fifth exemplary embodiment, modified examples 9 and 10 may be exemplified.

Modified Example 9

Figure 10B:
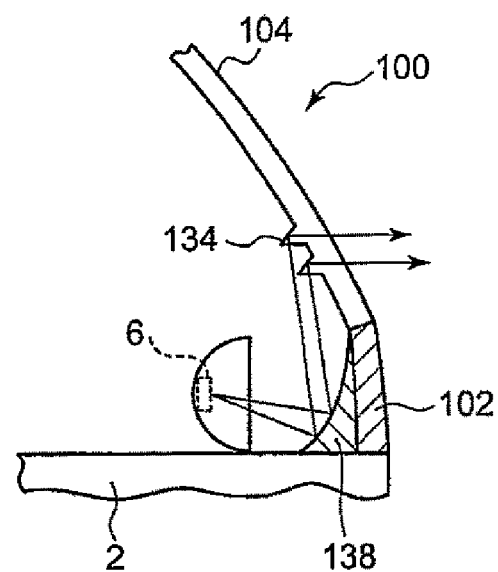
FIG. 10B is a schematic vertical cross-sectional view illustrating a configuration in the vicinity of a luminous part of a vehicular rear panel according to a modified example 9.

FIG. 10B is a schematic vertical cross-sectional view illustrating a schematic configuration of the vicinity of a luminous part of the vehicular rear panel according to the modified example 9. The vehicular rear panel 100 according to the modified example 9 is provided with a reflector 138 under the prism part 134. The prism part 134 is fixed to, for example, the surface of the front side of the vehicle of the backdoor panel 102. Also, the semiconductor light-emitting element 6 is disposed facing the light emitting surface toward the rear of the vehicle. The reflector 138 is disposed at the rear side of the vehicle of the semiconductor light-emitting element 6 and the positional relationship thereof with the semiconductor light-emitting element 6 is set such that the light radiated from the semiconductor light-emitting element 6 is reflected upward. The light radiated from the semiconductor light-emitting element 6 toward the rear of the vehicle is reflected upward by the reflector 138, incident on the prism part 134, and radiated to the rear side of the vehicle by the prism part 134. The reflector 138 guides the light radiated from the semiconductor light-emitting element 6 to the prism part 134 along the extending direction of the vehicular rear panel 100 and therefore forms a portion of the light guiding unit 106.

The light from the light source is radiated to the rear side of the vehicle via the reflector 138 and the prism part 134 when the vehicular rear panel 100 is in a closed state and the light from the light source is directly radiated to the rear side of the vehicle from the semiconductor light-emitting element 6 when the vehicular rear panel 100 is in an open state. Also, when the vehicular rear panel 100 is in a closed state, the output of the semiconductor light-emitting element 6 may be increased.

Modified Example 10

Figure 10C:
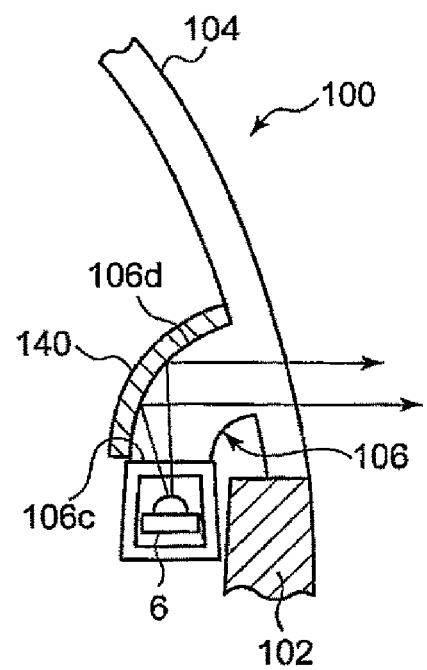
FIG. 10C is a schematic vertical cross-sectional view illustrating a configuration of a vehicular rear panel according to a modified example 10 in the vicinity of a luminous part.

FIG. 10C is a schematic vertical cross-sectional view illustrating a schematic configuration of the vicinity of a luminous part of the vehicular rear panel according to the modified example 10. The vehicular rear panel 100 according to the modified example 10 is integrally formed with a light guiding unit 106 protruding toward the front side of the vehicle on the surface of the front side of the vehicle of the rear window part 104. The light guiding unit 106 is formed with a bottom surface 106c extending in the substantially horizontal direction and a curved surface 106d extending from the end portion of the front side of the vehicle of the bottom surface 106c toward the rear side of the vehicle. A semiconductor light-emitting element 6 is fixed to the bottom surface 106c such that the light emitting surface faces upward. The curved surface 106d has a shape in which a paraboloid of revolution, of which the focus is the semiconductor light-emitting element 6, is set as a reference plane. The curved surface 106d is provided with a metal film 140 formed by depositing metal such as, for example, aluminum.

The light radiated from the semiconductor light-emitting element 6 is incident on the interior of the light guiding unit 106 from the bottom surface 106c. The light incident on the interior of the light guiding unit 106 proceeds along the extending direction of the rear window part 104 in the inside of the light guiding unit 106 and the proceeding direction of the incident light is directed toward the rear of the vehicle by the curved surface 106d. Also, the light incident on the interior of the light guiding unit 106 is reflected to the rear side of the vehicle by the metal film 140 and radiated toward the rear side of the vehicle from the surface of the rear side of the vehicle of the rear window part 104. Therefore, the curved surface 106d and the metal film 140 form the light emitting unit 108. In addition, since the light from the light source may be suppressed from proceeding toward the front side of the vehicle by the metal film 140, the metal film 140 also forms a light shielding part.

[Sixth Exemplary Embodiment]

The vehicular rear panel according to the sixth exemplary embodiment is provided with a convex part (dot) serving as a light emitting unit. Hereafter, descriptions about the vehicular rear panel according to the present exemplary embodiment will be made based on the features different from those of the first exemplary embodiment. Also, the same configurations as those of the first exemplary embodiment will be assigned with the same symbols and the descriptions and illustrations of the configurations and the effects will be omitted.

Figure 11A:
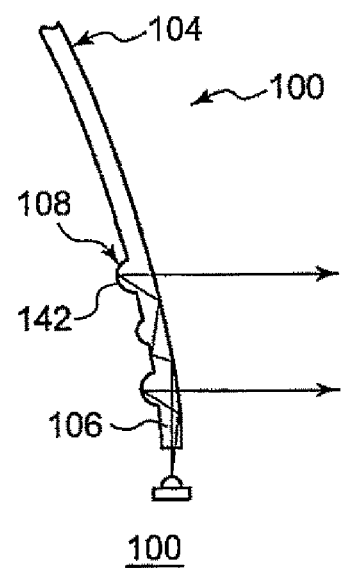
FIG. 11A is a schematic rear view illustrating a configuration in the vicinity of a luminous part of a vehicular rear panel according to a sixth exemplary embodiment.
Figure 11B:
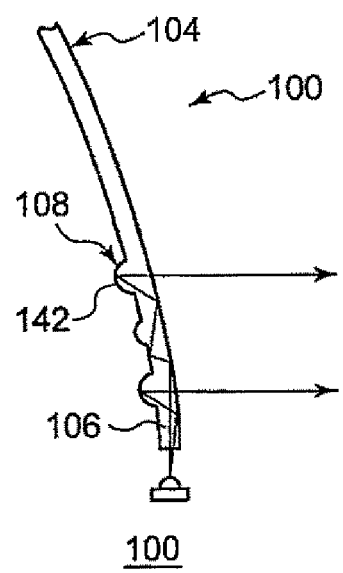
FIG. 11B is a cross-sectional view taken along line H-H in FIG. 11A.
Figure 11C:
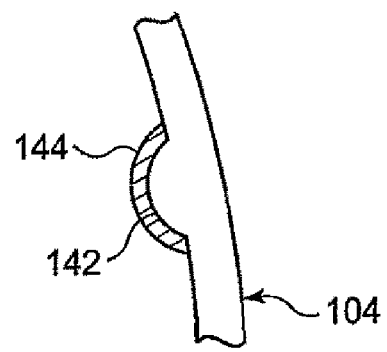
FIG. 11C is an enlarged cross-sectional view of a convex part.

FIG. 11A is a schematic rear view illustrating a configuration of the vicinity of a luminous part of the vehicular rear panel according to the sixth exemplary embodiment. FIG. 11A illustrates a state in which the vehicular rear panel 100 is viewed from the front side of the vehicle. Also, the backdoor panel is omitted. FIG. 11B is a cross-sectional view taken along line H-H in FIG. 11A. FIG. 11C is an enlarged cross-sectional view of convex parts.

The vehicular rear panel 100 according to the sixth exemplary embodiment is provided with a plurality of convex parts 142 protruding toward the front side of the vehicle on the surface of front side of the vehicle of the rear window part 104 made of a resin material. The convex parts 142 are integrally formed with the rear window part 104. The region where the convex parts 142 of the rear window part 104 are provided forms a light emitting unit 108. Also, a semiconductor light-emitting element 6 is disposed such that it is opposed to the end portion surface of the rear window part 104. A portion of the rear window part 104 interposed between the convex parts 142 and the semiconductor light-emitting element 6 forms a light guiding unit 106. The light radiated from the semiconductor light-emitting element 6 is incident on the interior of the light guiding unit 106 from the end portion surface of the rear window part 104. The light incident on the interior of the light guiding unit 106 proceeds in the inside of the light guiding unit 106 while being reflected from the inner side surface of the vehicle and the outer side surface of the vehicle of the light guiding unit 106 and reaches the light emitting unit 108.

The light reaching the light emitting unit 108 is directed toward the rear of the vehicle by the inner surface of the convex part 142 and radiated to the rear side of the vehicle from the outer side surface of the vehicle of the light emitting part 108. A light shielding layer 144 configured to suppress the light from leaking from the convex parts 142 to the front side of the vehicle is provided on the surface of the front side of the vehicle of the convex parts 142. The light shielding layer 144 is, for example, a film formed by applying a colored paint such as black or a reflective layer formed by depositing a metal. For example, the number, disposition region, density of the convex parts 142 may be set such that a driver's rear visibility does not deteriorate. Also, a shape such as, for example, a maker logo or an emblem may be caused to float on the rear window part 104 by arranging the convex parts 142 to form a shape of a letter or a figure. Further, although the convex parts 142 have a substantially half sphere shape in FIGS. 11A to 11C, the shape of the convex parts 142 is not limited thereto. For example, in a case where a shape of the emblem is caused to float, the convex parts 142 may have a consecutive line shape which is continuous to be coincident with the figure of the emblem, i.e., a cylindrical shape.

[Seventh Exemplary Embodiment]

The vehicular rear panel according to the seventh exemplary embodiment is provided with a plurality of stippled portions serving as a light emitting unit. Hereinafter, descriptions about the vehicular rear panel according to the present exemplary embodiment will be made based on the features different from those of the first exemplary embodiment. Also, the same configurations as those of the first exemplary embodiment will be assigned with the same symbols and the descriptions and illustrations of the configurations and the effects will be omitted.

Figure 12A:
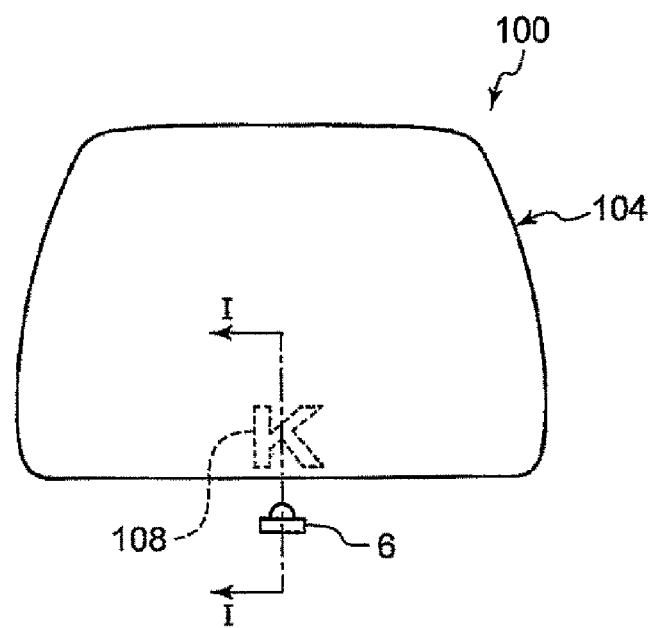
FIG. 12A is a schematic front view illustrating a configuration of a vehicular rear panel according to a seventh exemplary embodiment.
Figure 12B:
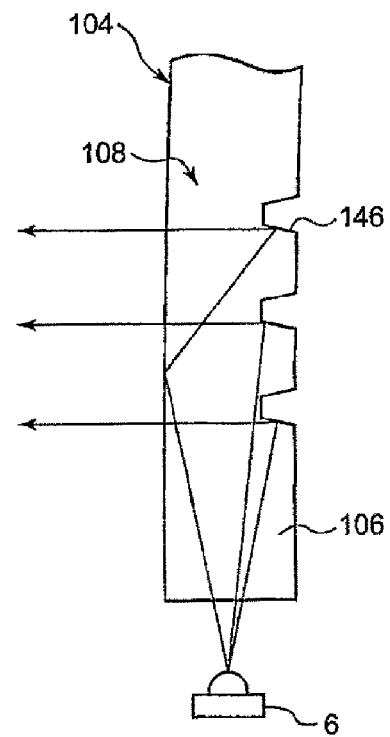
FIG. 12B is a cross-sectional view taken along line I-I in FIG. 12A.

FIG. 12A is a schematic front view illustrating a configuration of the vehicular rear panel according to the seventh exemplary embodiment. FIG. 12B is a cross-sectional view taken along line I-I in FIG. 12A. Also, the backdoor panel is omitted. The vehicular rear panel 100 according to the seventh exemplary embodiment is provided with a plurality of stippled portions 146 on the surface of the front side of the vehicle of the rear window part 104 made of a resin material. The region where the stippled portions 146 of the rear window part 104 are provided forms a light emitting unit 108. Also, the semiconductor light-emitting element 6 is disposed such that it is opposed to the end surface of the rear window part 104. A portion of the rear window part 104 interposed between the stippled portions 146 and the semiconductor light-emitting element 6 forms a light guiding unit 106. The stippled portions 146 are disposed such that they form a shape of a letter or a figure.

The light emitted from the semiconductor light-emitting element 6 is incident on the interior of the light guiding unit 106 from the end portion surface of the rear window part 104. The light incident on the interior of the light guiding unit 106 proceeds in the inside of the light guiding unit 106 while being reflected from the inner side surface of the vehicle and the outer side surface of the vehicle of the light guiding part 106 and reaches the light emitting part 108. The light reaching the light emitting unit 108 is directed toward the rear of the vehicle by the stippled portions 146 and radiated to the rear side of the vehicle from the outer side surface of the vehicle of the light emitting part 108. Accordingly, for example, a letter or a figure formed by the stippled portions may be caused to float on the rear window part 104. Also, for example, the number, the disposition region, the density of the stippled portions 146 may be set such that the light emitting unit 108 does not deteriorate a driver's rear visibility. Further, a light shielding part may be provided on the front side surface of the vehicle of the stipple portions 146.

[Eighth Exemplary Embodiment]

The vehicular rear panel according to the eighth exemplary embodiment is provided with a plurality of grooves for a defogger at the rear window part. Hereafter, descriptions about the vehicular rear panel according to the present exemplary embodiment will be made based on the features different from those of the first exemplary embodiment. Also, the same configurations as those of the first exemplary embodiment will be assigned with the same symbols and the descriptions and illustrations of the configurations and the effects will be omitted.

Figure 13A:
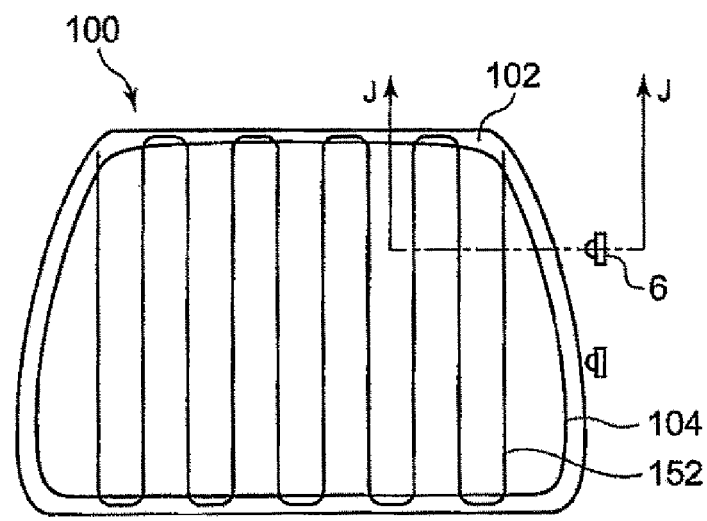
FIG. 13A is a schematic front view illustrating a configuration of a vehicular rear panel according to an eighth exemplary embodiment.
Figure 13B:
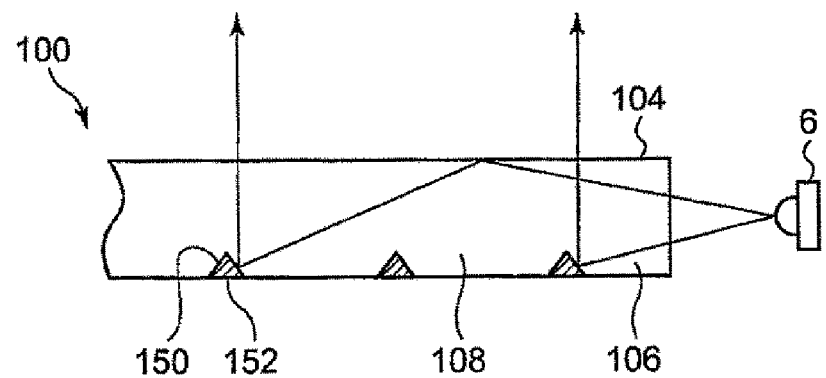
FIG. 13B is a cross-sectional view taken along line J-J in FIG. 13A.

FIG. 13A is a schematic front view illustrating a configuration of the vehicular rear panel according to the eighth exemplary embodiment. FIG. 13B is a cross-sectional view taken along line J-J in FIG. 13A. The vehicular rear panel 100 according to the eighth exemplary embodiment is provided with grooves 150 for forming a defogger on the surface of front side of the vehicle of the rear window part 104 made of a resin material. The grooves 150 are, for example, V-grooves. The grooves 150 are filled with a metal material such as, for example, aluminum or silver, thereby forming a defogger (hot-wire) 152. The region where the grooves 150 of the rear window part 104 are provided forms a light emitting unit 108. Also, a semiconductor light-emitting element 6 is disposed such that it is opposed the end surface of the rear window part 104. A portion of the rear window part 104 interposed between the grooves 150 and the semiconductor light-emitting element 6 forms a light guiding unit 106.

The light radiated from the semiconductor light-emitting element 6 is incident on the interior of the light guiding unit 106 from the end portion surface of the rear window part 104. The light incident on the interior of the light guiding unit 106 proceeds in the inside of the light guiding unit 106 while being reflected from the inner side surface of the vehicle and the outer side surface of the vehicle of the light guiding part 106 and reaches the light emitting part 108. The light reaching the light emitting unit 108 is directed toward the rear of the vehicle by the grooves 150 and radiated to the rear side of the vehicle from the outer side surface of the vehicle of the light emitting part 108. In this configuration, the grooves 150 for forming a defogger and the defogger 152 may be used as an optical member (a reflective member) configured to radiate the light from the light source to the rear side of the vehicle. Also, since the rear window part 104 is provided with the grooves 150, dripping of defogger paint may be suppressed. Thus, the defogger 152 may be simply formed.

[Ninth Exemplary Embodiment]

The vehicular rear panel according to the ninth exemplary embodiment is provided with a configuration to attach the light source and the rear window part to the backdoor panel part. Hereafter, descriptions about the vehicular rear panel according to the present exemplary embodiment will be made based on the features different from those of the first exemplary embodiment. Also, the same configurations as those of the first exemplary embodiment will be assigned with the same symbols and the descriptions and illustrations of the configurations and the effects will be omitted.

Figure 14A:
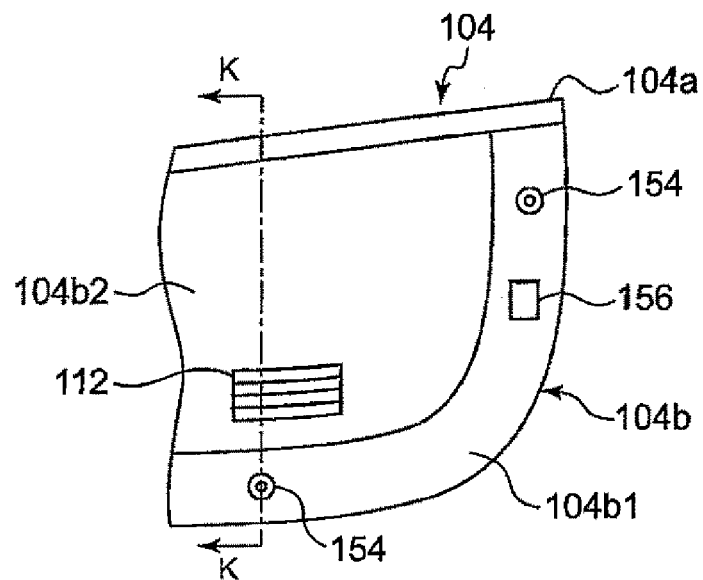
FIG. 14A is a schematic rear view illustrating a configuration of a rear window part of a vehicular rear panel according to a ninth exemplary embodiment.
Figure 14B:
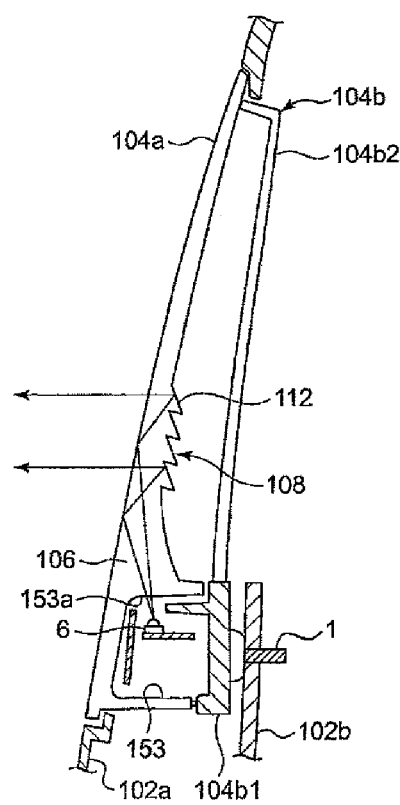
FIG. 14B is a cross-sectional view taken along line K-K in FIG. 14A.

FIG. 14A is a schematic rear view illustrating a configuration of a rear window part of the vehicular rear panel 100 according to the ninth exemplary embodiment. FIG. 14B is a cross-sectional view taken along the line K-K in FIG. 14A. Also, FIG. 14A illustrates a half of the rear window part 104 of the vehicle width direction. A portion omitted in the illustration has a shape which is axisymmetric to the illustrated portion. Further, FIG. 14B illustrates a state in which the rear window part 104 is attached to the backdoor panel.

The rear window part 104 of the vehicular rear panel 100 according to the ninth exemplary embodiment is provided with a rear window outer part 104a and a rear window inner part 104b each of which is made of a resin material. The rear window outer part 104a is made of a transparent resin material and provided with an accommodation space of a semiconductor light-emitting element 6 at the lower end thereof. The semiconductor light-emitting element 6 is accommodated such that the light emitting surface thereof faces upwardly. A plurality of light emitting steps 112 are formed at a predetermined location of the surface of the front side of the vehicle of the rear window outer part 104a and the region where the light emitting steps 112 of the rear window part 104 are provided forms a light emitting unit 108. Also, a portion of the rear window part 104 from the top surface 153a (ceiling surface) of the accommodation space 153 to the light emitting unit 108 forms a light guiding unit 106.

The light radiated from the semiconductor light-emitting element 6 is incident on the interior of the light guiding unit 106 from the top surface 153a. The light incident on the interior of the light guiding unit 106 proceeds in the inside of the light guiding unit 106 while being reflected from the inner side surface of the vehicle and the outer side surface of the vehicle of the light guiding part 106 and reaches the light emitting part 108. The light reaching the light emitting unit 108 is directed toward the rear side of the vehicle by the groove portions 150 and radiated to the rear side of the vehicle from the outer side surface of vehicle of the light emitting part 108.

The rear window inner part 104b is disposed at the front side of the vehicle of the rear window outer part 104a and attached to the rear window outer part 104a. The rear window inner part 104b is formed with a light shielding part 104b1 and a light transmitting part 104b2. The light shielding part 104b1 is made of a colored resin material and disposed such that it overlaps the peripheral end portion of the rear window outer part 104a including the accommodation space 153 in the longitudinal direction of the vehicle. Accordingly, the leakage of the light emitted from the semiconductor light-emitting element 6 toward the front of the vehicle may be suppressed. The light transmitting part 104b2 is transparent and disposed such that it overlaps the region where the peripheral end portion of the rear window outer part 104a is excluded in the longitudinal direction of the vehicle. A driver may visually recognize the rear side of the vehicle via the light transmitting part 104b2 and the rear window outer part 104a. For example, the rear window inner part 104b integrally formed with the light shielding part 104b1 and the light transmitting part 104b2 may be formed by, e.g., two-colored molding.

The light shielding part 104b1 is provided with an attachment part 154 such as, e.g., a stud bolt. The rear window part 104 may be attached to the backdoor inner panel 102b via the attachment part 154. Also, the light shielding part 104b1 is provided with an electric power supply unit 156 configured to supply the electric power to the semiconductor light-emitting element 6. As described above, in the present exemplary embodiment, the light shielding part 104b1 configured to shield the semiconductor light-emitting element 6 is used as an installation location of the attachment part 154 or the electric power supply unit 156. Thus, it is not necessary to provide an extra region where the attachment part 154 or the electric power supply part 156 is disposed and it may be avoided that the rear window part 104 becomes large while securing a driver's rear visual recognition region.

The present disclosure is not limited to each of the above-described exemplary embodiments and modified examples. Each exemplary embodiment and each modified example may be combined and changes such as, for example, various design changes may be made thereto based on the knowledge of a person skilled in the art. Such combinations or embodiments or modified examples where the changes are made are also included in the scope of the present disclosure. New exemplary embodiments obtained by combining the above-described respective exemplary embodiments or the respective modified examples and new exemplary embodiments obtained by combining the above-described respective exemplary embodiments or modified examples and the changes described below have respective effects of the combined exemplary embodiments, the modified examples and the changes in combination.

In the each of the above-described exemplary embodiments and modified examples, the light guiding unit 106 and the light emitting unit 108 may be provided in a region where the backdoor panel 102 is included, other than the rear window part 104. Also, a configuration in which the panel made of a resin material is provided with the light guiding unit and the light emitting unit and further a configuration in which the window part made of a resin material is provided with the light guiding unit and the light emitting unit may be applied not only to the vehicular rear panel but also, for example, to a vehicular side panel, a roof panel or a front panel. The term, "transparence" in each of the above-described exemplary embodiments and the modified examples refers to "having light transmittance (light permeability)" and includes colored transparence other than colorless transparence.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicular backdoor comprising:
   a light incident unit formed with an incident surface configured to refract light from a light source provided externally from the vehicular backdoor in a peripheral end of an opening of a rear vehicular body part to face a rear side of a vehicle;
   a light guiding unit configured to reflect the light incident via the light incident unit thereby guiding the light along an extending direction of the vehicular backdoor; and
   a light emitting unit configured to reflect the light guided by the light guiding unit thereby emitting the light toward the rear side of the vehicle,
   wherein the vehicular backdoor is made of a resin material, configured to be opened/closed, and integrally formed with the light incident unit, the light guiding unit and light emitting unit each made of the resin material.

2. The vehicular backdoor of claim 1, wherein the vehicular backdoor includes a curved portion where scenery becomes discontinuous when viewed from a driver side and the light guiding unit and the light emitting unit are provided at the curved portion.

3. The vehicular backdoor of claim 1, further comprising a light shielding part configured to suppress the light from the light source from proceeding toward the front side of the vehicle.

4. The vehicular backdoor of claim 3, wherein the light shielding part is a liquid crystal shutter.

5. The vehicular backdoor of claim 1, wherein one end of the light guiding unit is disposed in the vicinity of the light source installed on the rear vehicular body part and the other end of the light guiding unit is disposed in the vicinity of the light emitting unit.

6. The vehicular backdoor of claim 1, wherein the vehicular backdoor is provided with a cavity and the light guiding unit is inserted into the cavity.

7. The vehicular backdoor of claim 1, wherein a dot-shaped light from the light source is converted into a line-shaped light by passing through the light guiding unit, and the line-shaped light is transferred to the light emitting unit in the vehicular backdoor to be emitted to the rear side of the vehicle.

8. The vehicular backdoor of claim 1, wherein the extending direction of the vehicular backdoor is a horizontal direction.

9. The vehicular backdoor of claim 1, wherein the light incident unit is formed in an area where the light from the light source and the vehicular backdoor overlap with each other.

10. The vehicular backdoor of claim 1, wherein the light incident unit is made of a plurality of light incident steps configured to refract the light from the light source into the light guiding unit.

* * * * *